(12) United States Patent
Wiik et al.

(10) Patent No.: US 9,864,086 B2
(45) Date of Patent: Jan. 9, 2018

(54) SATURATION ESTIMATION USING MCSEM DATA AND STOCHASTIC PETROPHYSICAL MODELING

(75) Inventors: Torgeir Wiik, Trondheim (NO); Per Atle Olsen, Trondheim (NO); Lars Ole Løseth, Trondheim (NO)

(73) Assignee: Statoil Petroleum AS, Stavamger (NO)

( * ) Notice: Subject to any disclaimer, the term of this patent is extended or adjusted under 35 U.S.C. 154(b) by 403 days.

(21) Appl. No.: 14/410,111

(22) PCT Filed: Jun. 25, 2012

(86) PCT No.: PCT/EP2012/062230
§ 371 (c)(1),
(2), (4) Date: Mar. 4, 2015

(87) PCT Pub. No.: WO2014/000758
PCT Pub. Date: Jan. 3, 2014

(65) Prior Publication Data
US 2015/0369940 A1    Dec. 24, 2015

(51) Int. Cl.
*G01V 1/40*     (2006.01)
*G01V 3/08*     (2006.01)

(52) U.S. Cl.
CPC ............... *G01V 3/08* (2013.01); *G01V 3/083* (2013.01)

(58) Field of Classification Search
CPC ... G01V 3/28; G01V 3/38; G01V 3/08; G01V 3/083; G01N 15/088
(Continued)

(56) References Cited

U.S. PATENT DOCUMENTS

| 7,912,649 B2 * | 3/2011 | Harris ................. G01V 3/083 367/14 |
| 2009/0005994 A1 | 1/2009 | Srnka et al. |

(Continued)

FOREIGN PATENT DOCUMENTS

| RU | 2428720 C2 | 9/2011 |
| WO | 2010098800 A1 | 9/2010 |

(Continued)

OTHER PUBLICATIONS

Morten, et al., Title: "3D Reservoir Characterization of a North Sea Oil Field Usign Quantitative Seismic & CSEM Interpretation", SEG Extended Abstracts, 2011, pp. 1-5.

(Continued)

*Primary Examiner* — An Do
(74) *Attorney, Agent, or Firm* — Eversheds Sutherland (US) LLP

(57) ABSTRACT

A method for estimating saturation using mCSEM data and stochastic petrophysical models by quantifying the average water saturation in a reservoir given the transverse resistance (TR) obtained from mCSEM data, including the following steps: a) obtaining mCSEM survey data from a subsurface region of interest, b) performing an inversion of the obtained mCSEM data, c) subtracting a background resistivity trend from the mCSEM inversion data from the resistivity trend of the mCSEM inversion data from inside a hydrocarbon reservoir, d) estimating the location of an anomaly in the mCSEM inversion data, e) estimating the magnitude of the transverse resistance associated with an anomaly from the mCSEM inversion data, f) estimating an initial average reservoir saturation corresponding to transverse resistance using a stochastic petrophysical model and Monte Carlo simulation connecting reservoir parameters to transverse resistance, and g) integrating the obtained saturation distribution as a function of transverse resistances over the (Continued)

assumed distribution of transverse resistances to obtain a final estimation of the fluid saturation probability.

4 Claims, 4 Drawing Sheets

(58) Field of Classification Search
USPC .................................................. 702/2, 6, 7
See application file for complete search history.

(56) References Cited

U.S. PATENT DOCUMENTS

| | | |
|---|---|---|
| 2009/0306895 A1 | 12/2009 | MacGregor et al. |
| 2010/0017132 A1 | 1/2010 | Glinsky et al. |
| 2010/0185393 A1 | 7/2010 | Liang et al. |
| 2011/0301849 A1 | 12/2011 | Houck |

FOREIGN PATENT DOCUMENTS

| | | |
|---|---|---|
| WO | 2011/056444 A1 | 5/2011 |
| WO | 2008013613 A2 | 1/2016 |

OTHER PUBLICATIONS

Shahin, et al., Title: "Petro-electric Modelling for CSEM Reservoir Characterization and Monitoring", Geophysics vol. 77, 2012, pp. 1-12.

Wiik, et al., Title: "TIV Contrast Source Inversion of mCSEM data", Geophysics, vol. 76, Issue 1, p. 1. (Abstract).

Olsen, Title: "Coarse-Scale Resistivity for Saturation Estimation in Heterogeneous Reservoirs Based on Archie's Formula", Geophysics, vol. 76, Issue 2, 2011, pp. 1-2. (Abstract).

Jinsong Chen and G. Michael Hoverstein; Title: "Joint Inversion of Marine Seismic AVA and CSEM Data Using Statistical Rock-Physics Models and Markov Random Fields", Geophysics, Society of Exploration , vol. 77, No. 1, Jan. 1, 2012, pp. R65-R80.

Chen J, et al; Title: "Effects of Uncertainty in Rock-Physics Models on Reservoir Parameter Estimation using Seismic Amplitude Variation with Angle and Controlled-Source Electromagnetics Data", Geophysical Prospecting, vol. 57, Jan. 1, 2009 pp. 61-74.

Jinsong Chen, et al.; Title: "Special Section—Marine Controlled—Source Electromagnetic Methods. A Bayesian Model for Gas Saturation Estimation Using Marine Seismic AVA and CSEM Data", Geophysics, Society of Exploration, vol. 72, No. 2, Mar. 1, 2007, pp. WA85-WA 95.

Arild Buland and Odd Kolbjornsen; Title"Bayesian Inversion of CSEM and Magnetotelluric Data" Geophysics, Society of Exploration, vol. 77, No. 1, Jan. 1, 2012, pp. E33-E42.

Constable S., et al.; Title: "Mappling Thin Resistors and Hydrocarbons with Marine EM Methods: Insights from 1D Modeling", Geophysics, Society of Exploration, vol. 71, No. 2, Mar. 1, 2006, pp. G43-G51.

\* cited by examiner

SATURATION ESTIMATION USING MCSEM DATA AND STOCHASTIC PETROPHYSICAL MODELING

TECHNICAL FIELD

The present invention relates generally to the field of exploration geophysics and the characterization of potential hydrocarbon reservoirs. More specifically, the invention relates to processing techniques for the estimation of water and hydrocarbon saturation in subsea geological formations using marine controlled-source electromagnetic (mCSEM) data and stochastic petrophysical modeling.

BACKGROUND ART

The procurement and inversion of electromagnetic data has in recent years become a valuable tool in assessing the potential specific geophysical formations. Controlled-source electromagnetic (CSEM) data is often combined with other measurement data, such as seismic, gravity gradiometry, magnetotelluric (MT) or perhaps nearby well-logs to mention a few. In most mCSEM surveying applications, a mCSEM system comprises an electromagnetic sender, or antenna, that is either towed from a vessel, stationary in the body of water or on the seabed, and likewise a plurality of electromagnetic receivers that are either placed at known locations on the seabed or towed from a vessel or stationary in the body of water. The receivers can detect variations in electrical resistance as a function of variations in source signal, offset between the source and receiver and the properties of the geological layers, including their inherent electrical conductive properties. For instance, a hydrocarbon layer will exhibit a higher electrical resistance, ca. 20-300 ohm-m, than either seawater, ca. 0.3 ohm-m, or an overburden of sediment or rock, ca. 0.3-4 ohm-m. The acronyms CSEM or mCSEM are generally used interchangeably by those skilled in the art, and are not meant to be delimiting in any technical sense, unless explicitly specified. The terms resistivity or resistance are also used interchangeably by those skilled in the art, and are not meant to be delimiting in any technical sense, unless explicitly specified. The various types of measurement methods, due to their inherent designs, often acquire data with different temporal and spatial scales. As these data sets have increased in size and complexity, the challenges in processing such large data sets has also increased. Inversion processing techniques have been developed in step with instrumentation, whereby the aim of the inversion is to optimize the parameters of a model to find the best fit between the calculated value and the measured data whereby the measured data can be used to constrain models.

Prior art modeling methods are based on applying resistance directly from mCSEM inversion results, and inserting these into an appropriate saturation-resistivity relation, such as Archie's equation or similar. Data inversion can be described as providing an estimate of geophysical properties by way of updating an initial model based upon available the measured data and other prior knowledge from a given area. In brief, Archie's equation is an empirical quantitative relationship between porosity, electrical conductivity, and brine saturation of rocks. The equation is a basis for modern well log interpretation as it relates borehole electrical conductivity measurements to hydrocarbon saturations. There are various forms of Archie's equation, such as the following general form:

$$S_w = [(a/\Phi^m) * (R_w/R_t)]^{(1/n)}$$

Where:
$S_w$: water saturation
$\Phi$: porosity
$R_w$: formation water resistivity
$R_t$: observed bulk resistivity
a: a constant (usually about 1)
m: cementation factor (usually about 2)
n: saturation exponent (usually about 2)

Assuming porosity and water and bulk resistivity (and exponents in Archie's equation) are known, the hydrocarbon saturation ($S_{HC}$) estimate can be obtained from the simple algebraic expression: $S_{HC} = 1 - S_w$. This workflow assumes in principle that resistivity, porosity and saturation are constant within the CSEM discretization.

Published documentation describing the existing technology is referenced at the end of the present section.

At present there are several challenges associated with the current state of the art mCSEM data evaluation methods:
1). The resistances from mCSEM inversions can be inaccurate due to reasons such as weak optimization algorithms due to computational constraints, the use of lower dimensional (not proper 3D) inversions, and the low frequency of the mCSEM signal can yield observations that includes a convolution of both the signal above and below the hydrocarbon reservoir.
2). In addition, all parameters in the water saturation formula (for instance, Archie's equation) and mCSEM resistivities are associated with uncertainties. True resistivity is very difficult to determine. This is an indication that the procedure should be stochastic for incorporation into a final estimation.
3). Further, mCSEM resistances are coarse scale measurements. Variations within the reservoir column will affect the measurement, and the assumption of constant porosity and saturation in the reservoir is very often not valid.

SUMMARY OF THE INVENTION

Therefore, it is a main objective of the present invention to provide an improved and novel method for the estimation of saturation in subsea geological formations using marine controlled-source electromagnetic (mCSEM) data and stochastic petrophysical modeling.

The above mentioned deficiencies and uncertainties associated with the prior art are rectified by way of the following novel improvements.
1) Defining the transverse resistance (TR) associated with the anomaly rather than resistances, based on mCSEM data acquired over a large lateral area potentially covering several possible prospects. Since data obtained by mCSEM is more sensitive to TR than the exact depth and value of the resistance, the estimate of saturation is thus more robust than prior art methods.
2) Stochastic petrophysical modeling combined with mCSEM results for quantitative pre-well estimates which also includes variability of porosity and saturation within the reservoir. Uncertainties associated with the parameters are included in the analysis. Uncertainties incorporated in the model input propagate naturally through the stochastic petrophysical model to account for the uncertainties in the final estimate of saturation. Some input parameters are similar to those used in prospect risking. It also takes into account the assumed spatial variability of porosity and saturation within the reservoir in the saturation estimate.
3) An essential part of this method is that no wells are needed. The present method enables the possibility to obtain pre-well saturation estimates when mCSEM data are available, thus a pre-well estimate can be obtained using only mCSEM inversion results.

These stated advantages are aimed at solving the deficiencies in the prior art. The improved method is disclosed according to the appended independent claim. Advantageous further developments are subject of the dependent claims.

A first aspect of the present invention relates to a method for the estimation of fluid saturation in a reservoir comprising the flowing steps:
a) obtaining mCSEM survey data from a subsurface region of interest,
b) performing an inversion of said obtained mCSEM data,
c) subtracting a background resistivity trend from said mCSEM inversion data from the resistivity trend of said mCSEM inversion data from inside a hydrocarbon reservoir,
d) estimating the location of an anomaly in the mCSEM inversion data,
e) estimating the magnitude of the transverse resistance associated with an anomaly from the mCSEM inversion data,
f) estimating an initial average reservoir saturation corresponding to transverse resistance using a stochastic petrophysical model and Monte Carlo simulation connecting reservoir parameters to transverse resistance, and
g) integrating the obtained saturation distribution as a function of transverse resistances over the assumed distribution of transverse resistances to obtain a final estimation of the fluid saturation probability.

A second aspect of the present invention relates to a method of the first aspect, wherein the model reservoir parameters for estimating the relation of average reservoir saturation to transverse resistance, as observed by the mCSEM inversion, are comprised of the following:
reservoir thickness,
average porosity and variation within reservoir,
average saturation and variation with reservoir,
the covariance between the porosity and saturation,
resistivity in the formation water, i.e. salinity, and
exponents in Archie's equation relating resistivity and saturation.

A third aspect of the present invention relates to a method of the second aspect, wherein the resistivity-saturation relation is initially estimated from the Indonesia equation or the Simandoux equation or the Waxman-Smit equation or the dual water equation.

A fourth aspect of the present invention relates to a method of the second or third aspect, further comprising:
a) assigning a mean value and a variation range or distribution to all of the said parameters, depending on the information available,
b) performing the Monte Carlo simulation to sample the total space defined by the uncertainties of the parameters,
c) plotting an average water saturation $S_w$ versus transverse resistance from said sampling and the water saturation equation,
d) combining said plot with the transverse resistance from said mCSEM inversions, and
e) estimating a hydrocarbon saturation $S_{HC}$, whereby $S_{HC}=1-S_w$.

A fifth aspect of the present invention relates to a method of the fourth aspect, wherein the estimation of the final probability distribution of saturation comprises the flowing steps:
a) integrating over the range of estimated transverse resistances, including uncertainties, from mCSEM results, and
b) weighting a 2D function integrand according to an assumed probability for the estimated transverse resistances.

BRIEF DESCRIPTION OF THE DRAWINGS

The invention will be described in detail with reference to the attached figures. It is to be understood that the figures are designed solely for the purpose of illustration and are not intended as a definition of the limits of the invention, for which reference should be made to the appended claims. It should be further understood that the figures are not necessarily drawn to scale and that, unless otherwise indicated, they are merely intended to schematically the procedures described therein.

DETAILED DESCRIPTION OF THE INVENTION

This invention aims at quantifying the average water saturation in a reservoir given the transverse resistance obtained from mCSEM data. In general the invention can be described by the following workflow comprising 3 main steps:

Step 1

Step 1 is defined by the sub-steps: inversion of measured mCSEM data and TR-anomaly determination.

Figure 1:
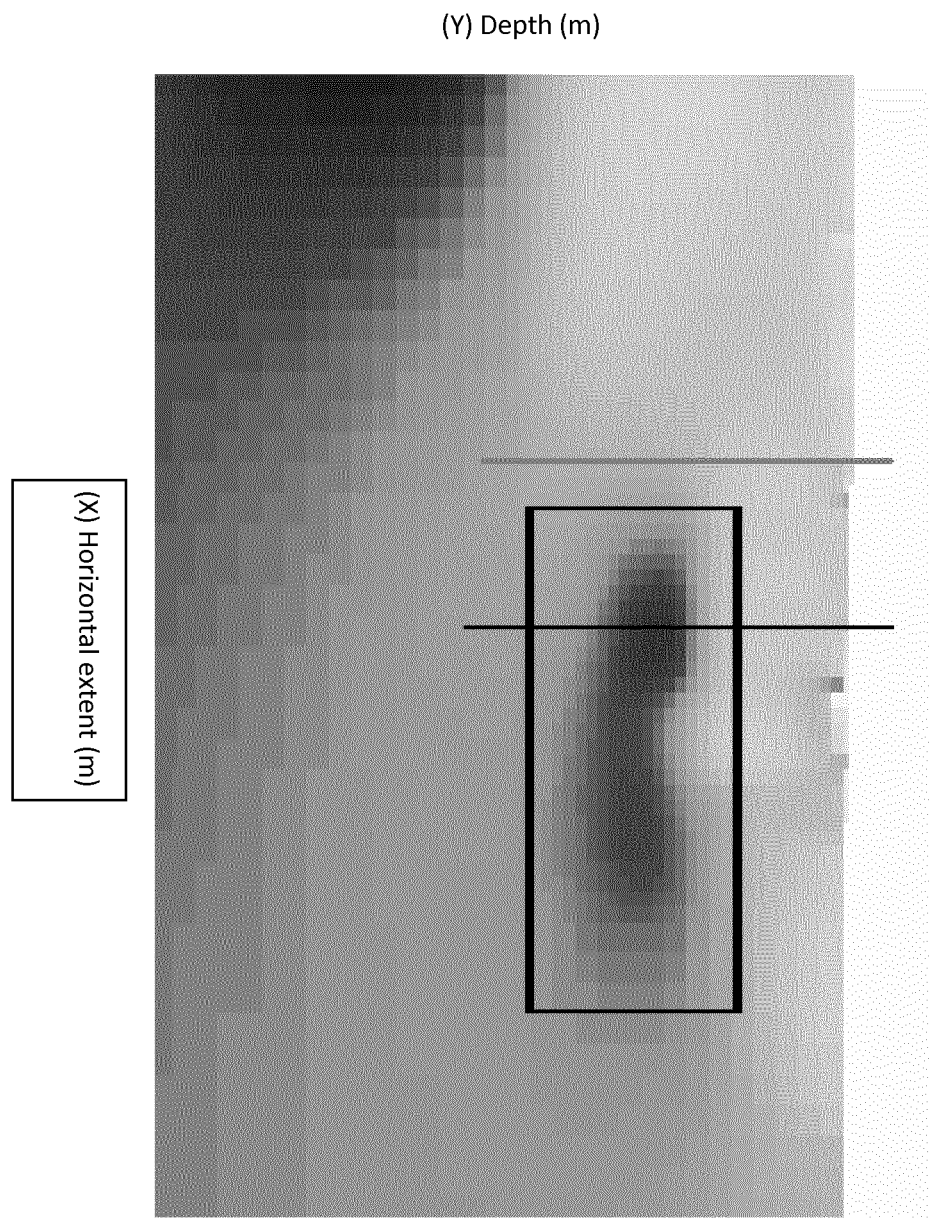
FIG. 1 shows an example of 2.5D mCSEM inversion result.
Figure 2:
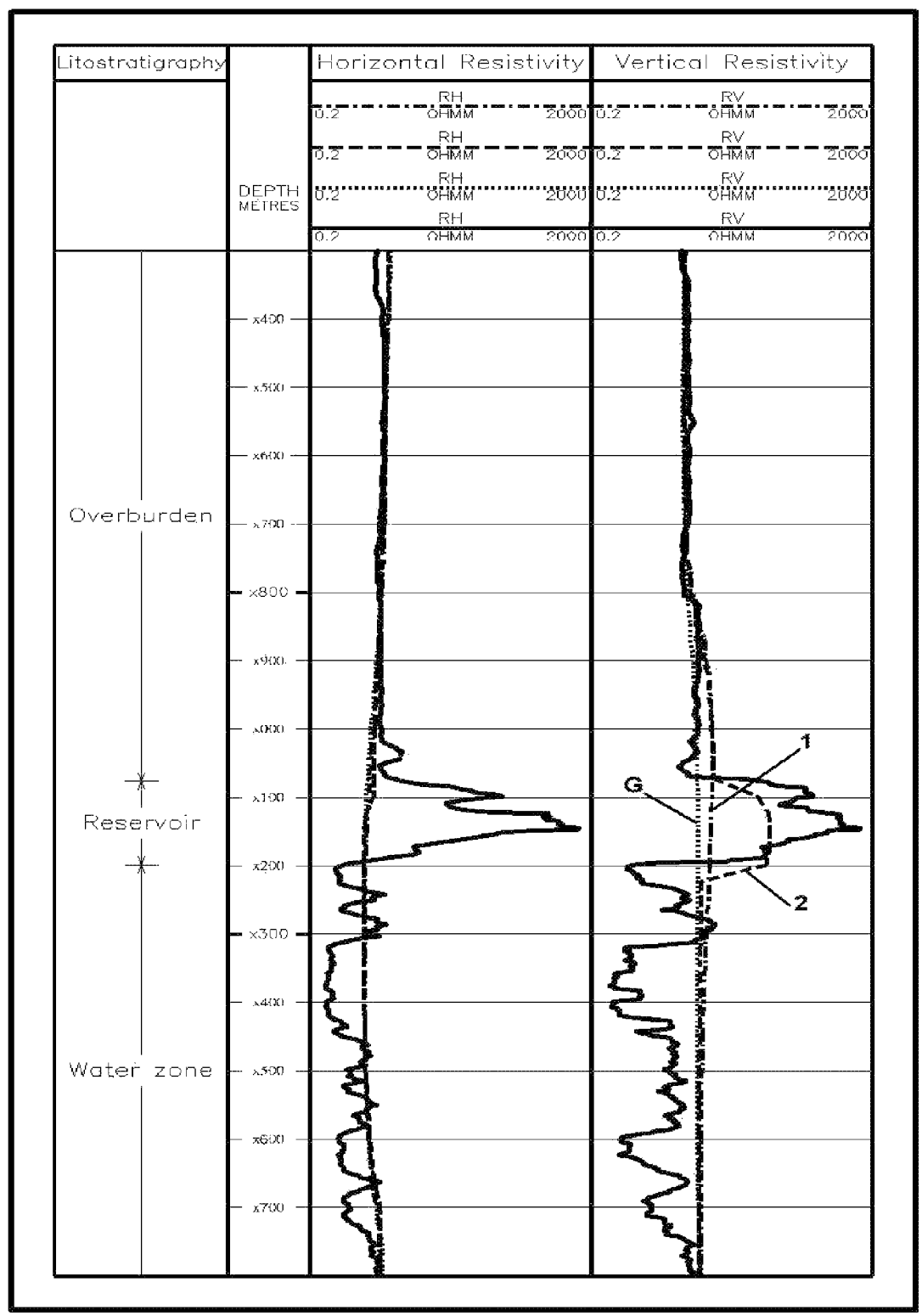
FIG. 2 shows an example of logs from mCSEM inversions co-rendered with real logs.

Measured mCSEM survey data are obtained for a subsurface region of interest. Inversions are then performed on the measured mCSEM survey data for the subsurface region. The anomaly assumed to be associated with the reservoir is located, and separated from the background resistivity trend. By location, it is meant geographic location on the seabed and vertical depth under the seabed. The difference from the background inversion forms the anomalous TR associated with the reservoir to be used in combination with the petrophysical model (step 2). FIG. 1 shows an example of lower dimensional 2.5D mCSEM inversion result. The middle rectangle shows an anomaly associated with the reservoir, the black line shows a "well" through the anomaly and the grey line shows a "well" outside of the anomaly. The difference between the "log" for the grey and black lines in the area around the reservoir depth forms the TR associated with the reservoir. The approximate extent of the plot is 15000 m in the horizontal (x-axis) and 3500 m in the vertical (y-axis), whereas the smaller box marking the anomaly is approximately 4500 m in the horizontal (x-axis) and 875 m in the vertical (y-axis). FIG. 2 shows an example of logs from mCSEM inversions with horizontal resistivity (left) and vertical resistivity (right). The difference between the two logs around the reservoir region forms the basis for locating and defining the magnitude of the anomalous transverse resistance (TR) (product of resistivity and thickness) associated with the reservoir from the mCSEM inversion results. Refering to the vertical resistivity, shown in the panel on the right, the grey line (G) is a well outside the reservoir from 2.5D unconstrained inversion, the black dotted line (1) with shading is unconstrained 2.5D inversion through the reservoir. The TR is assumed to be due to the lithology/fluid content of the reservoir. Finally, the solid black line (2) with shading is a constrained 2.5D inversion through the reservoir with a correction due to the lower dimensional 2.5D assumption included. The difference between the grey line (G) and one of the other two (1 or 2) defines the transverse resistance (TR) when integrated over the relevant depths, here approximately 500 m. When using the constrained 2.5D result with 3D correction factor a TR of approximately 24000 Ohm-m$^2$ is obtained.

Step 2

Step 2 is defined by the sub-steps: average saturation estimation, stochastic petrophysical modeling and incorporation of parameter uncertainties.

The estimation of appropriate average reservoir saturation corresponding to the obtained TR requires using a stochastic petrophysical model relating reservoir parameters to TR. TR is in particular mainly dependent on the following reservoir parameters:

Reservoir thickness

Average porosity and variation within reservoir

Average saturation and variation within the reservoir, in addition to the covariance between the porosity and saturation.

Resistivity in the formation water, i.e. salinity

Exponents in Archie's equation relating resistivity and saturation.

None of these parameters are known exactly in an exploration setting, but parameters such as reservoir thickness and porosity are estimated in the prospect risking process. All of the parameters in the framework above are assigned a mean value and a variation range or distribution, depending on the information available.

Figure 3:
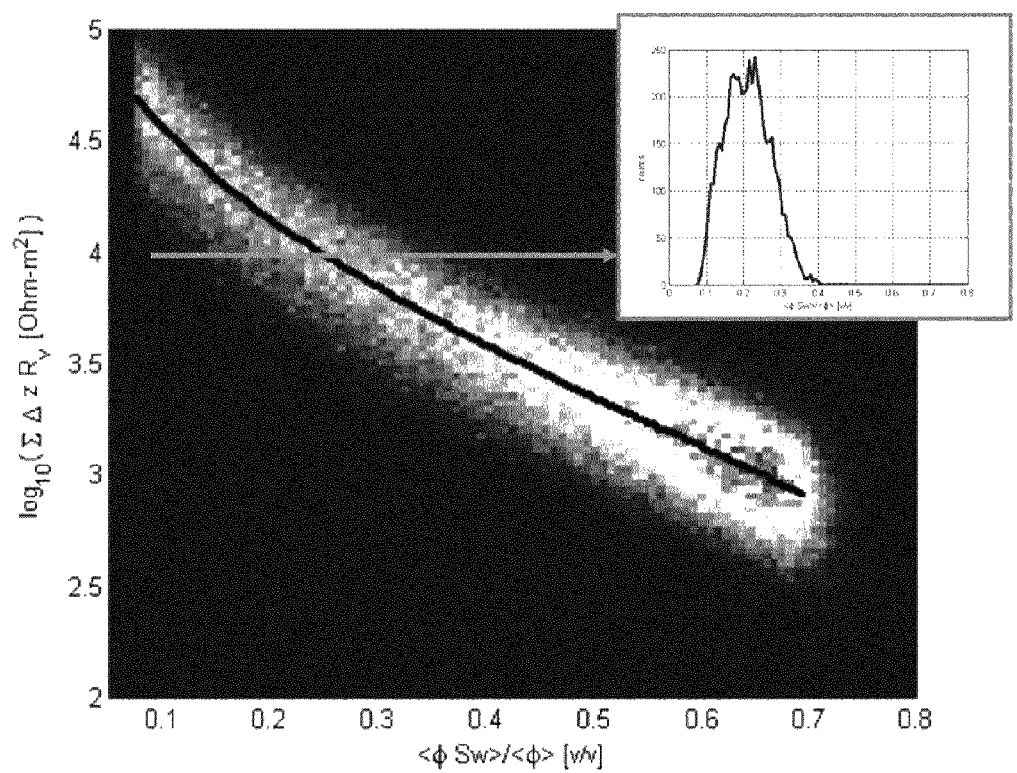
FIG. 3 shows a typical output from the stochastic petrophysical model.

FIG. 3 shows a typical output from the stochastic petrophysical model. It shows the average weighted water saturation ($<\varphi$ Sw$>/<\varphi>$[v/v]) on the x-axis versus the logarithm of TR ($\log_{10}(\Sigma\Delta$ z R$_v$ [Ohm-m$^2$])) on the y-axis, where the individual pixels show how many samples from a Monte Carlo sampling have ended up in the given positions. The Monte Carlo simulation is performed to sample the total space defined by the uncertainties of the parameters. FIG. 3 is based on the Monte Carlo sampling and Archie's equation, although optionally, other equations than Archie's equation may be used instead for the resistivity-saturation relation. Combining the results from FIG. 3 with the TR from the mCSEM inversions a hydrocarbon saturation estimate can be obtained as $S_{HC}=1-S_w$. The dark lower left corner shows that low water saturation (high hydrocarbon saturation) and low TR are not compatible, and vice versa for the upper right corner. The brighter trend in the middle shows the covariance of saturation and TR. The graph is the intersection through the plot at TR=10000 Ohm-m$^2$, and shows the uncertainty in saturation at this TR. The TR indicated in FIG. 2 would give $\log_{10}(TR)=4.38$. Incorporating uncertainties in the inversion result and the 3D correction factor due to the lower-dimensional 2.5D inversion yields an uncertainty range of TR. This yields a rectangle, rather than a line at a given TR, which represents the most likely saturations given the anomalous TR.

In an exploration setting, the parameters in a petrophysical resistivity-saturation relation (for instance, Archie's equation) are not exactly known, but a probability distribution can be assigned to them. The cementation factor "m" can for example be normally distributed with expectation "2" and a standard deviation. Likewise the saturation exponent "n" can also be normally distributed with an expectation "2" and standard deviation. The water resistivity can for example be assigned a flat probability distribution from the minimum expected salinity to the maximum expected salinity and combined with the assumed temperature profile. Other alternatives to Archie's equation can also be applied.

Any petrophysical relation connecting a suitable set of petrophysical parameters, a subset of which is listed above, to resistivity can be used. Examples are the Indonesia equation, the Simandoux equation, Waxman-Smit and the dual water equation. For instance, the above mentioned models take into account the added conductivity along clay surfaces in different manners. The average porosity in the reservoir can be assigned from prospect risking. However within each reservoir there is a variation in porosity which has to be included. The assumed porosity variation within the reservoir can be estimated by a truncated probability distribution where the truncation limits are the minimum reservoir porosity (porosity cutoff) to the maximum reservoir porosity (estimated from burial depth and experience), but the expectation should correspond to the prospect risking. From experience, porosity and saturation often are correlated. Low porosity often corresponds with higher water saturation due to more capillary bound water. This correlation can be incorporated by including a covariance between porosity and saturation. The stochastic petrophysical simulation samples parameter values from the respective probability density functions by Monte-Carlo simulation and constructs the resistivity-saturation relation for each possible set of reservoir parameters. After connecting the possible reservoir resistivity values in a series connection and calculating the transverse resistance, a distribution of possible saturation—transverse resistance relations is found.

Step 3

Step 3 is defined by the sub-steps: integration of TR distribution and a final estimate of the saturation probability distribution.

Figure 4:
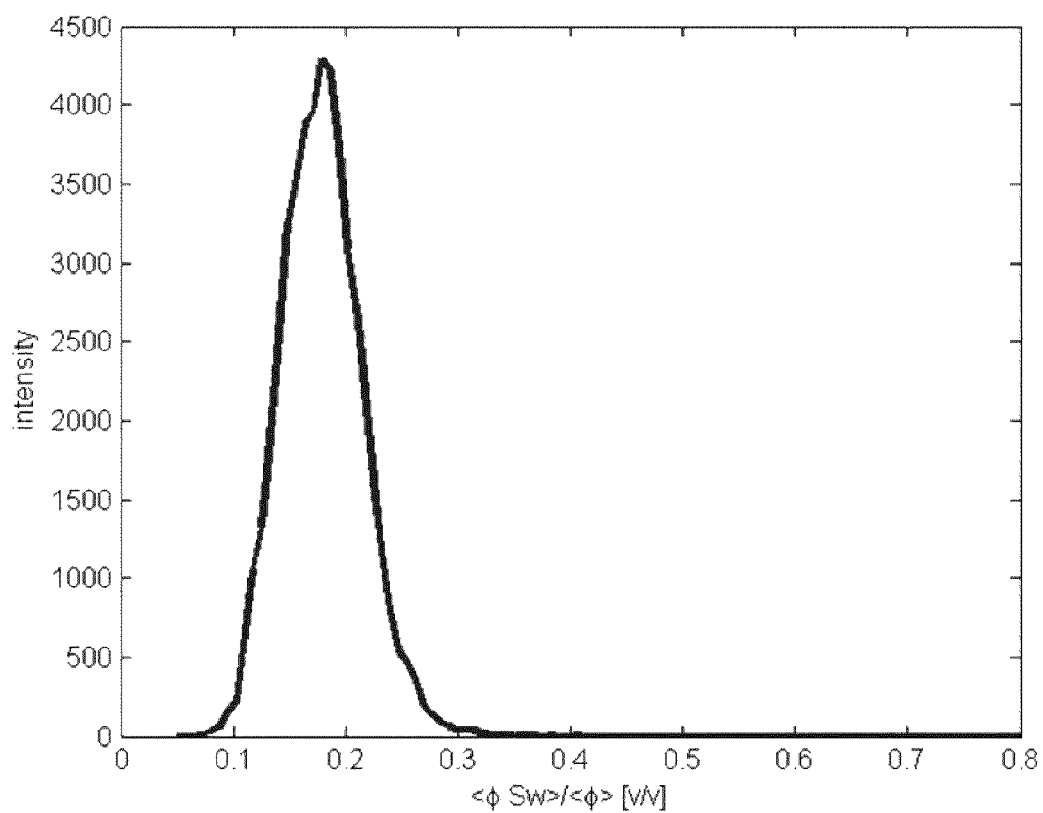
FIG. 4 shows a probability distribution after integrating the distribution in FIG. 3.

In order to obtain a posterior probability distribution regarding the average water saturation in the reservoir given the assumed relevant TR range from mCSEM results an integration is performed over the range of estimated transverse resistances. Uncertainties from the mCSEM data inversion results are included in the integration. This corresponds to integrating over a range of the y-axis in FIG. 3. The integrand (the 2D function described by FIG. 3) is weighted according to the assumed probability for the estimated transverse resistances. Finally, integrating the distribution represented by the plot in FIG. 3 over the uncertainty range of the TR from the mCSEM inversions yields the expected final average saturation distribution. FIG. 4 shows such a probability distribution (up to a constant) after integrating the distribution in FIG. 3 over the TR range specified from mCSEM inversion results with weights reflecting the probabilities for each TR. The horizontal x-axis represents the weighted average water saturation ($<\varphi$ Sw$>/<\varphi>$[v/v]).

The present method is an approach for estimating saturation using mCSEM data and stochastic petrophysical models by quantifying the average water saturation in a reservoir given the transverse resistance (TR) obtained from mCSEM data. The TR of interest is that associated with the vertical resistivity, as mCSEM is not sensitive to the horizontal resistivity within the reservoir. As mCSEM data are known to be more sensitive to TR than the exact depth and value of the resistivity, this is more robust than the existing workflow. Further, the method is implemented as a stochastic method, which naturally incorporates the associated uncertainties of both input and output. It may be necessary to consider a depth range larger than a seismic outline of the prospect when calculating the TR, due to the low resolution of mCSEM and uncertainty of depth position of resistivity.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the scope of the appended claims.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously. Any reference signs in the claims should not be construed as limiting the scope of the invention.

REFERENCES

Poupon, A. and Leveaux, J., "Evaluation of water saturation in Shaly Formations", Trans. SPWLA 12$^{th}$ Annual logging Symposium, 1971, pp. 1-2.

Simandoux, P., "Dielectric measurements in Porous Media and application to Shaly Formation", Revue del'Institut Fancais du Petrole, Supplementaray Issue, 1963, pp. 193-215.

Archie, G. E., 1942, The electrical resistivity log as an aid in determining some reservoir characteristics, AIME trans. 146, p. 54-62.

Clavier, C., Coates, C., and Dumanoir, C., 1984, The theoretical and experimental bases for the "dual water" model for the interpretation of shaly-sands: *SPE Journal*, vol. 24, no. 2, p. 153-168.

Waxman, M. H. and Smits, L. J. M., 1968, Electrical conductivities in oil-bearing shaly-sands: *SPE Journal*, vol. 8, no. 2, p. 107-122.

Chen et al., A Bayesian model for gas saturation estimation using marine seismic AVA and CSEM data, Geophysics 72,2007.

Morten et al., 3D reservoir characterization of a North Sea oil field using quantitative seismic & CSEM interpretation, SEG Extended Abstracts, 2011.

We claim:

1. A method for the estimation of fluid saturation in a reservoir comprising the flowing steps:
    a) obtaining marine controlled-source electromagnetic (mCSEM) survey data from a subsurface region of interest,
    b) performing an inversion of said obtained mCSEM data to obtain mCSEM inversion data,
    c) locating an anomaly in the mCSEM inversion data,
    d) subtracting a background resistivity trend of said mCSEM inversion data from the resistivity trend of said mCSEM inversion data at the anomaly,
    e) estimating the magnitude of a transverse resistance associated with the anomaly using the difference from the background resistivity trend,
    f) estimating a distribution of the average reservoir saturation corresponding to transverse resistance using a stochastic petrophysical model and Monte Carlo simulation connecting reservoir parameters to transverse resistance, and
    g) integrating the obtained saturation distribution with respect to transverse resistances and weighted by an assumed distribution of the estimated transverse resistances to obtain a final estimation of the fluid saturation probability.

2. A method according to claim 1, wherein the reservoir parameters are comprised of the following:
    reservoir thickness,
    average porosity and variation within reservoir,
    average saturation and variation with reservoir,
    the covariance between the porosity and saturation,
    resistivity in the formation water, i.e. salinity, and
    exponents in Archie's equation relating resistivity and saturation.

3. A method according to claim 2, wherein the resistivity-saturation relation is initially estimated from the Indonesia equation or the Simandoux equation or the Waxman-Smit equation or the dual water equation.

4. A method according to claim 2 wherein estimating the distribution comprises:
    a) assigning a mean value and a variation range or distribution to all of the said parameters, depending on the information available,
    b) performing a Monte Carlo simulation to sample the total space defined by the uncertainties of the parameters, and
    c) plotting an average water saturation (Sw) versus transverse resistance (TR) from said sampling and a water saturation equation, and
    and
    wherein the method further comprises estimating a hydrocarbon saturation ($S_{HC}$), whereby $S_{HC}=1-S_w$.

* * * * *